United States Patent
Cho et al.

(10) Patent No.: US 11,289,696 B2
(45) Date of Patent: Mar. 29, 2022

(54) METHOD FOR MANUFACTURE OF SULFUR-CARBON COMPOSITE

(71) Applicant: LG CHEM, LTD., Seoul (KR)

(72) Inventors: Eunkyung Cho, Daejeon (KR);
Suenghoon Han, Daejeon (KR);
Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 44 days.

(21) Appl. No.: 16/649,873

(22) PCT Filed: Nov. 16, 2018

(86) PCT No.: PCT/KR2018/014136
§ 371 (c)(1),
(2) Date: Mar. 23, 2020

(87) PCT Pub. No.: WO2019/103409
PCT Pub. Date: May 31, 2019

(65) Prior Publication Data
US 2020/0259169 A1     Aug. 13, 2020

(30) Foreign Application Priority Data
Nov. 21, 2017   (KR) .................. 10-2017-0155407

(51) Int. Cl.
*H01M 4/36*  (2006.01)
*H01M 4/38*  (2006.01)
(Continued)

(52) U.S. Cl.
CPC ............. *H01M 4/364* (2013.01); *H01M 4/38* (2013.01); *H01M 4/587* (2013.01); *H01M 10/052* (2013.01)

(58) Field of Classification Search
CPC ..................................................... H01M 4/364
See application file for complete search history.

(56) References Cited

U.S. PATENT DOCUMENTS

2013/0302684 A1   11/2013  Koshika et al.
2014/0186522 A1    7/2014  Woo et al.
(Continued)

FOREIGN PATENT DOCUMENTS

CN    106744841 A    5/2017
EP       3059790 A1   8/2016
(Continued)

OTHER PUBLICATIONS

Extended European Search Report for European Application No. 18880545.1, dated Oct. 14, 2020.
(Continued)

*Primary Examiner* — William D Young
(74) *Attorney, Agent, or Firm* — Birch, Stewart, Kolasch & Birch, LLP

(57) ABSTRACT

A method for manufacturing a sulfur-carbon composite including the following steps of: (a) drying a porous carbon material; and (b) adding sulfur to the porous carbon material resulting from the drying of step (a), and mixing the sulfur and porous carbon material by a ball milling process and then heating the resulting ball milled product.

9 Claims, 2 Drawing Sheets

(51) Int. Cl.
*H01M 4/587* (2010.01)
*H01M 10/052* (2010.01)

(56) References Cited

U.S. PATENT DOCUMENTS

| | | | |
|---|---|---|---|
| 2014/0315102 A1 | 10/2014 | Tsuji et al. | |
| 2015/0030525 A1* | 1/2015 | Mitra | C01B 32/318 423/445 R |
| 2016/0248087 A1* | 8/2016 | Kim | H01M 4/362 |
| 2016/0372742 A1 | 12/2016 | Yu et al. | |
| 2017/0323735 A1 | 11/2017 | Roh et al. | |
| 2018/0287120 A1* | 10/2018 | Nakajima | H01M 10/049 |
| 2020/0343578 A1* | 10/2020 | Oberwalder | H01M 10/052 |

FOREIGN PATENT DOCUMENTS

| | | |
|---|---|---|
| JP | 2000-511342 A | 8/2000 |
| JP | 2016-535716 A | 11/2016 |
| KR | 10-2014-0086811 A | 7/2014 |
| KR | 10-2014-0091293 A | 7/2014 |
| KR | 10-2017-0124700 A | 11/2017 |
| WO | WO 97/44840 A1 | 11/1997 |
| WO | WO 2012/086198 A1 | 6/2012 |

OTHER PUBLICATIONS

Wei et al., "Pig bone derived hierarchical porous carbon and its enhanced cycling performance of lithium-sulfur batteries," Energy & Environmental Science, vol. 4, 2011, pp. 736-740.

Zhang et al., "Activated carbon with ultrahigh specific surface area synthesized from natural plant material for lithium-sulfur batteries," Journal of Materials Chemistry A, vol. 2, 2014, pp. 15889-15896.

Gleeson et al., "Biosignature Detection at an Arctic Analog to Europa", Astrobiology, 2012, vol. 12, No. 2, pp. 135-150.

International Search Report (PCT/ISA/210) issued in PCT/KR2018/014136, dated Feb. 21, 2019.

Wang et al., "Polymer lithium cells with sulfur composites as cathode materials", Electrochimica Acta 2003, vol. 48, pp. 1861-1867.

Ye et al., "MWCNT porous microspheres with an efficient 3D conductive network for high performance lithium-sulfur batteries", J. Mater. Chem. A. 2016, vol. 4, pp. 775-780.

Yonhap News, "KAIST identifies principles of carbon nanotubes", Online—Jul. 26, 2011, Total 2 pages.

\* cited by examiner

[Figure 1]
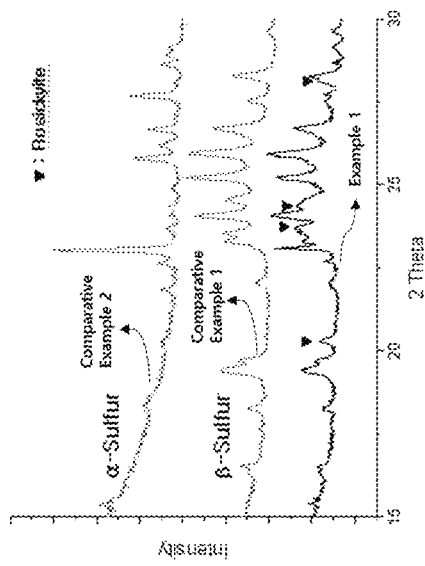

[Figure 2]
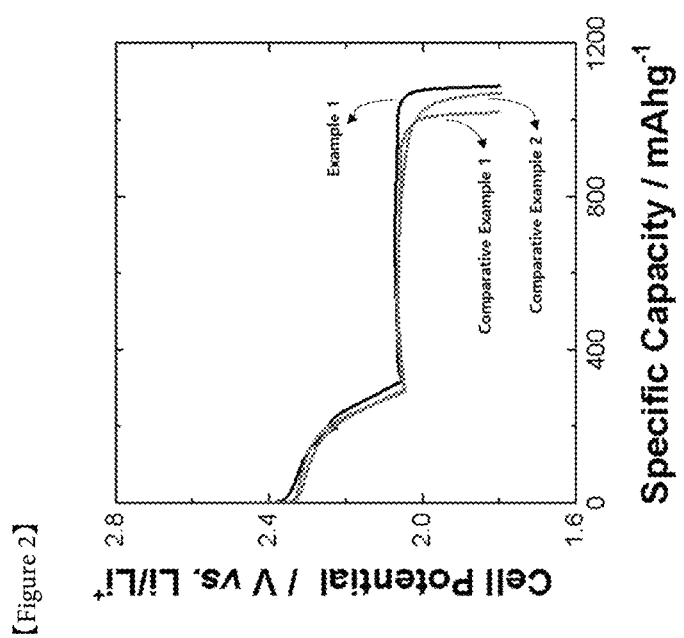

METHOD FOR MANUFACTURE OF SULFUR-CARBON COMPOSITE

TECHNICAL FIELD

This application claims priority to and the benefits of Korean Patent Application No. 10-2017-0155407, filed with the Korean Intellectual Property Office on Nov. 21, 2017, the entire contents of which are incorporated herein by reference.

The present invention relates to a method for manufacturing a sulfur-carbon composite.

BACKGROUND ART

Recently, there has been growing interest in energy storage technologies. As the fields of application have expanded to the energy of mobile phones, camcorders, and laptops, and further to electric vehicles, efforts for the research and development on electrochemical devices have increasingly materialized.

In this aspect, the field of electrochemical devices is receiving the most attention, and among these, the development of chargeable and dischargeable secondary batteries has become the focus of attention. Recently, in the development of such batteries, research and development for new electrode and battery design is being done to improve a capacity density and specific energy.

Among the currently applied secondary batteries, a lithium secondary battery developed in the early 1990s has been spotlighted due to advantages such as a high operation voltage and significantly high energy density as compared to conventional batteries using an aqueous electrolyte such as a Ni-MH battery, a Ni—Cd battery and a sulfuric acid-Pb battery.

Particularly, a lithium-sulfur (Li—S) battery is a secondary battery using a sulfur-based material having sulfur-sulfur (S—S) bonds as a positive electrode active material, and using a lithium metal as a negative electrode active material. Sulfur, a main material of the positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) currently studied, and therefore, it is the most promising battery among batteries that have been developed so far.

During a discharge reaction of a lithium-sulfur battery, an oxidation reaction of lithium occurs in a negative electrode (anode), and a reduction reaction of sulfur occurs in a positive electrode (cathode). Sulfur has a cyclic S$_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted into linear-structured lithium polysulfide (Li$_2$S$_x$, x=8, 6, 4, 2) from the cyclic S$_8$ by the reduction reaction, and as a result, lithium sulfide (Li$_2$S) is finally produced when such lithium polysulfide is completely reduced. By the process of being reduced to each lithium polysulfide, a discharge behavior of a lithium-sulfur battery shows gradual discharging voltages unlike lithium ion batteries.

However, in the case of the lithium-sulfur battery, problems of low electrical conductivity of sulfur, elution and volume expansion of lithium polysulfide during charging and discharging and the resulting problems of low coulomb efficiency and rapid capacity reduction should be solved.

In this lithium sulfur battery system, when using a sulfur-based compound as a positive electrode active material and an alkali metal such as lithium as a negative electrode active material, lithium-polysulfide generated during charging and discharging in the battery is transferred to the negative electrode, thereby reducing the life of the lithium-sulfur battery, and the reactivity is decreased due to a large amount of the lithium-polysulfide.

Accordingly, various method have been attempted to solve such problems.

The initial discharge capacity is strongly influenced by the degree of the uniform distribution and the crystallinity of the sulfur contained in the composite. In order to increase the initial discharge capacity, making sulfur with high reactivity is important part on the studies for Li—S positive electrode active material.

In the sulfur-carbon composite used for the Li—S battery, there is a reactivity difference according to the phase of sulfur. α-sulfur, which is known to be the most stable, and β-sulfur, which is formed by changing the crystal structure of the α-sulfur by heating, is the most commonly used phases of sulfur, but these also had limitations on the reactivity. In particular, when mixing a large amount of sulfur, the sulfur and a porous carbon material are mixed with ball mill and then heated. The β-sulfur contained in the sulfur-carbon composite thus manufactured has a problem of lowering the discharge capacity.

Therefore, in order to solve such problems, it is necessary to introduce another sulfur phase, Rosickyite, to reduce the occurrence of overvoltage and to increase internal reactivity.

PRIOR ART DOCUMENTS

Patent Documents

[Patent Document 1] Korean Patent Publication No. KR 2014-0091293, "Electrode including mixed composites of self-assembled carbon nanotube and sulphur for lithium sulphur battery, and the fabrication method thereof."

DISCLOSURE

Technical Problem

The present inventors have conducted various studies and confirmed that, in order to manufacture a sulfur-carbon composite containing sulfur of Rosickyite phase with high reactivity, the porous carbon material is dried and then mixed with sulfur to conduct ball milling under specific conditions to manufacture the sulfur-carbon composite containing sulfur of Rosickyite phase, thereby completing the present invention.

Accordingly, an aspect of the present invention provides a method for manufacturing a sulfur-carbon composite coated with a material capable of reducing the occurrence of overvoltage and enhancing the internal reactivity by depositing the sulfur of Rosickyite phase with high reactivity to a porous carbon material.

Technical Solution

According to an aspect of present invention, there is provided a method for manufacturing a sulfur-carbon composite comprising the following steps of:
(a) drying a porous carbon material; and
(b) adding sulfur to the porous carbon material resulting from the drying of step (a), and mixing the sulfur and porous carbon material by a ball milling process and then heating the resulting ball milled product.

Advantageous Effects

The present invention has effects that it is possible to maintain the specific surface area of the composite and inhibit the elution of lithium polysulfide as well as reducing the occurrence of overvoltage and enhancing the internal reactivity unlike the prior art, by depositing the sulfur of Rosickyite phase with high reactivity to a porous carbon material.

DESCRIPTION OF DRAWINGS

FIG. 1 is a graph showing the results of XRD analysis of the sulfur-carbon composite according to Example of the present invention and Comparative Examples.

FIG. 2 is a graph showing the initial discharge capacity of the lithium-sulfur batteries manufactured with the sulfur-carbon composites of Example of the present invention and Comparative Examples.

BEST MODE

Hereinafter, the present invention will be described in detail with reference to accompanying drawings so that those skilled in the art may readily implement the present invention. However, the present invention may be implemented in various different forms, and is not limited to the present specification.

In the drawings, in order to clearly describe the present invention, parts that are not related to description are omitted and similar elements are denoted by similar reference numerals throughout the specification. In addition, sizes and relative sizes of the constituents shown in the drawings are unrelated to actual scales, and may be reduced or exaggerated for clarity of the descriptions.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The term 'composite' used in the present specification means a material combining two or more materials, and exhibiting more effective functions while forming physically and chemically different phases.

A lithium-sulfur battery uses sulfur as a positive electrode active material and a lithium metal as a negative electrode active material. During discharging of the lithium-sulfur battery, the oxidation reaction of lithium occurs at the negative electrode and the reduction reaction of sulfur occurs at the positive electrode. At this time, the reduced sulfur is converted into lithium polysulfide in combination with the lithium ion transferred from the negative electrode, and finally accompanies the formation of the lithium sulfide.

The lithium-sulfur battery has a significantly higher theoretical energy density than the conventional lithium secondary battery, and the sulfur used as a positive electrode active material is low in the cost due to its abundant resources, so that the manufacturing cost of the battery can be lowered. Due to these advantages, it is drawing attention as the next-generation battery.

Despite these advantages, it is difficult to realize all of the theoretical energy density in actual operation due to the low electrical conductivity and lithium ion conduction characteristics of the sulfur, which is a positive electrode active material.

In order to improve the electrical conductivity of the sulfur, methods, for example, composite formation with conductive materials such as carbon and polymer and coating have been used. Among various methods, the sulfur-carbon composite is most commonly used as a positive electrode active material because it is effective in improving the electrical conductivity of the positive electrode, but is still insufficient in terms of charge/discharge capacity and efficiency. The capacity and efficiency of the lithium-sulfur battery may vary depending on the amount of the lithium ion transferred to the positive electrode. Thus, the ease of transfer of the lithium ion into the sulfur-carbon composite is important for high capacity and high efficiency of the battery.

Method for Manufacturing Sulfur-Carbon Composite

Accordingly, in order to secure reactivity of a sulfur-carbon composite and an electrolyte and an effect of improving capacity and efficiency characteristics of a lithium-sulfur battery, the present invention provides a method for manufacturing a sulfur-carbon composite by depositing sulfur of Rosickyite phase to the sulfur-carbon composite.

First, the method for manufacturing a sulfur-carbon composite according to the present invention comprises the following steps of: (a) drying a porous carbon material; and (b) adding sulfur to the porous carbon material resulting from the drying of step (a), and mixing the sulfur and porous carbon material by a ball milling process and then heating the resulting ball milled product.

The method for manufacturing a sulfur-carbon composite according to the present invention comprises the step (a) of drying a porous carbon material.

The porous carbon material provides a skeleton to which the sulfur, a positive electrode active material, can be uniformly and stably fixed, and compensates the electrical conductivity of the sulfur so as to make the electrochemical reaction proceed smoothly.

In general, the porous carbon material can be prepared by carbonizing precursors of various carbon materials. The porous carbon material may include non-uniform pores therein, wherein the average diameter of the pores is in the range of 1 nm to 200 nm, and the porosity or void fraction may be in the range of 10% to 90% of the total volume of the porous carbon. If the average diameter of the pores is less than the above range, the pore size is only a molecular level and therefore, it may be difficult to impregnate the sulfur. On the contrary, if the average diameter of the pores is over the range, the mechanical strength of the porous carbon is weakened and therefore, it may not be preferable for application to an electrode manufacturing process.

The porous carbon material may be spherical, rod-like, needle-like plate-like, tube-like or bulky form without limitation as long as it is commonly used in a Lithium-Sulfur battery.

The porous carbon material may be a porous structure or a material having high specific surface area as long as it is commonly used in the art. For example, the porous carbon material may be at least one selected from the group consisting of graphite; graphene; carbon black such as denka black, acetylene black, ketjen black, channel black, furnace black, lamp black and thermal black; carbon nanotube (CNT) such as single-wall carbon nanotube (SWCNT) and multi-wall carbon nanotube (MWCNT); carbon fiber such as graphite nanofiber (GNF), carbon nanofiber (CNF) and activated carbon fiber (ACF); and activated carbon, but not limited thereto.

In the step (a) of the method for manufacturing a sulfur-carbon composite according to the present invention, by drying the porous carbon material, the sulfur of Rosickyite phase with high reactivity can be deposited on the surface of the porous carbon material later.

The drying may be conducted by the conventional method commonly used in the art, and preferably at a temperature of 100° C. to 150° C. for 6 hours to 36 hours. By drying in this way, the moisture content in the porous carbon material is made to be 50 ppm or less, so that the sulfur of Rosickyite phase with high reactivity can be deposited on the surface of the porous carbon material.

Then, the method for manufacturing a sulfur-carbon composite according to the present invention comprises the step of adding sulfur to the porous carbon material resulting from the drying of step (a), and mixing the sulfur and porous carbon material by a ball milling process and then heating the resulting ball milled product.

The sulfur used in the step (b) may be at least one selected from the group consisting of inorganic sulfur ($S_8$), $Li_2S_n$ (n≥1), organic sulfur compound and carbon-sulfur polymer [$(C_2S_x)_n$, x=2.5 to 50, n≥2]. Preferably, the sulfur may be inorganic sulfur ($S_8$).

Further, the sulfur is located on the surface as well as inside of the pores of the porous carbon material, and at this time, it may be present in an area of less than 100%, preferably 1% to 95%, and more preferably 60% to 90% of the entire outer surface of the porous carbon material. When the sulfur is present on the surface of the porous carbon material within the above range, it can exhibit the maximum effect in terms of the electron transfer area and the wettability of the electrolyte. Specifically, since the sulfur is impregnated thinly and evenly on the surface of the porous carbon material within the above range, the electron transfer contact area can be increased in the charging and discharging process. If the sulfur is located in the 100% region of the surface of the porous carbon material, the porous carbon material is completely covered with the sulfur. Therefore, since the wettability of the electrolyte may be lowered and the contact with the conductive material contained in the electrode is decreased, the electrode cannot receive electrons and therefore, it cannot participate in the reaction.

The sulfur-carbon composite can carry sulfur in a high content due to three-dimensionally interconnected and regularly arranged pores having various sizes in the structure. This can lead to the formation of soluble polysulfide by an electrochemical reaction, but it can also be located inside the sulfur-carbon composite. Therefore, when the polysulfide is eluted, a three-dimensionally entangled structure is maintained, thereby suppressing the collapse of a positive electrode structure. As a result, the Lithium-Sulfur battery including the sulfur-carbon composite has an advantage that a high capacity can be realized even at high loading. The loading amount of the sulfur in the sulfur-carbon composite according to the present invention may be 1 $mg/cm^2$ to 20 $mg/cm^2$.

In the step (b), when mixing the sulfur and the porous carbon material, a weight ratio of the sulfur and the porous carbon material may be 9:1 to 5:5, preferably 8:2 to 7:3. If the weight ratio is less than the above range, the amount of the binder required for preparing positive electrode slurry is increased as the content of the porous carbon material is increased. The increase in the amount of the binder eventually increases the sheet resistance of the electrode, and acts as an insulator to block the electron pass, thereby deteriorating the cell performance. On the contrary, if the weight ratio is over the above range, sulfurs are aggregated each other and may be difficult to receive electrons, thereby making it difficult to participate directly in electrode reaction.

In the step (b), when mixing the sulfur and the porous carbon material, a weight of the mixture of the sulfur and the porous carbon material may be 10 g or more. In case of mixing in a small amount of less than 10 g, the sulfur and the porous carbon material can be mixed easily with a mortar and the like, but in case of mixing in a large amount of 10 g or more, the sulfur and the porous carbon material cannot be mixed easily. Therefore, the sulfur and the porous carbon material should be mixed through a ball milling process. However, when using the ball milling process in a large amount, the sulfur in the sulfur-carbon composite is converted into the sulfur of β-phase, thereby reducing the discharge capacity. Accordingly, the present invention is characterized by improving the discharge capacity by including the sulfur of Rosickyite phase in the sulfur-carbon composite by a ball milling process using a porous carbon material dried to 50 ppm or less.

In the step (b), when mixing the sulfur and the porous carbon material, the mixing may be conducted by a ball milling process.

The ball milling process may use a conventional apparatus for ball milling process, and zirconia ball having a size of 1 mm to 5 mm may be used as a ball used for ball milling. The ball milling process may be conducted at a milling condition of 100 rpm to 500 rpm for 30 minutes to 5 hours.

In the step (b), after ball milling the sulfur and the porous carbon material, heating is conducted. The heating may be conducted at a temperature of 130° C. to 170° C., and the heating time is not particularly limited, and the heating may be conducted for 15 minutes to 2 hours. If the temperature range exceeds 170° C., the sulfur may be vaporized, and if the temperature is lower than 130° C., the sulfur may not melt and therefore, the sulfur may not be uniformly distributed. Further, if the heating time is less than 15 minutes, the sulfur may be insufficiently melt, and therefore the sulfur may not be impregnated, and the heating time exceeds 2 hours, some of the sulfur may be vaporized or non-uniformly impregnated.

The sulfur-carbon composite of the present invention manufactured by the method described above contains the sulfur of Rosickyite phase in the sulfur-carbon composite.

The sulfur of Rosickyite phase is monoclinic sulfur, known as an unstable phase, and it has a higher reactivity than sulfur of stable phase. Further, when a single crystal is formed, plate-like and needle-like crystals are formed, but in the present invention, the single crystal state is not maintained since the sulfur is heated and then impregnated in the carbon material. Therefore, the sulfur can be uniformly deposited on the sulfur-carbon composite.

According to the conventional invention, when sulfur is mixed with an un-dried porous carbon material and then heated, as a result of XRD analysis, only the sulfur of α-phase or the sulfur of β-phase is observed. However, according to the manufacturing method of the present invention, when a porous carbon material dried under specific conditions is mixed under specific conditions and then heated, the sulfur is converted into the sulfur of Rosickyite phase. Further, the ratio that the sulfur contained in the sulfur-carbon composite is converted into the sulfur of Rosickyite phase may be larger than 0% to less than 10% based on the molar ratio of the sulfur. If the proportion of the Sulfur of Rosickyite phase in the sulfur contained in the sulfur-carbon composite is 10% or more, there is a problem in that the stability of the composite is deteriorated, for example, phase is changed in the process of manufacturing the electrode and at a temperature of drying the electrode due to the unstable morphology of the Rosickyite phase.

Further, a part of the sulfur contained in the sulfur-carbon composite is converted into at least one of the sulfur of α-phase and the sulfur of β-phase.

Sulfur-Carbon Composite

When manufacturing the sulfur-carbon composite of the present invention, the porous carbon material dried under specific conditions is mixed under specific conditions and then heated. Thus, the phase of the sulfur contained in at least one of the inner or outer surfaces of the sulfur-carbon composite is converted into the Rosickyite phase, and thus, the sulfur-carbon composite of the present invention contains the sulfur of Rosickyite phase.

The sulfur-carbon composite of the present invention contains a porous carbon material; and sulfur at least a part of the inside and the surface of the porous carbon material.

The porous carbon material provides a skeleton to which the sulfur, a positive electrode active material, can be uniformly and stably fixed, and compensates the electrical conductivity of the sulfur so as to make the electrochemical reaction proceed smoothly.

In general, the porous carbon material can be prepared by carbonizing precursors of various carbon materials. The porous carbon material may include non-uniform pores therein, wherein the average diameter of the pores is in the range of 1 nm to 200 nm, and the porosity or void fraction may be in the range of 10% to 90% of the total volume of the porous carbon. If the average diameter of the pores is less than the above range, the pore size is only a molecular level and therefore, it may be difficult to impregnate the sulfur. On the contrary, if the average diameter of the pores is over the range, the mechanical strength of the porous carbon is weakened and therefore, it may not be preferable for application to an electrode manufacturing process.

The porous carbon material may be spherical, rod-like, needle-like plate-like, tube-like or bulky form without limitation as long as it is commonly used in a Lithium-Sulfur battery.

The porous carbon material may be a porous structure or a material having high specific surface area as long as it is commonly used in the art. For example, the porous carbon material may be at least one selected from the group consisting of graphite; graphene; carbon black such as denka black, acetylene black, ketjen black, channel black, furnace black, lamp black and thermal black; carbon nanotube (CNT) such as single-wall carbon nanotube (SWCNT) and multi-wall carbon nanotube (MWCNT); carbon fiber such as graphite nanofiber (GNF), carbon nanofiber (CNF) and activated carbon fiber (ACF); and activated carbon, but not limited thereto.

The sulfur may be at least one selected from the group consisting of inorganic sulfur ($S_8$), $Li_2S_n$ ($n \geq 1$), organic sulfur compound and carbon-sulfur polymer [$(C_2S_x)_n$, $x=2.5$ to 50, $n \geq 2$]. Preferably, inorganic sulfur ($S_8$) may be used.

In the sulfur-carbon composite according to the present invention, a weight ratio of the sulfur and the porous carbon material may be 9:1 to 5:5, preferably 8:2 to 7:3. If the weight ratio is less than the above range, the amount of the binder required for preparing positive electrode slurry is increased as the content of the porous carbon material is increased. The increase in the amount of the binder eventually increases the sheet resistance of the electrode, and acts as an insulator to block the electron pass, thereby deteriorating the cell performance. On the contrary, if the weight ratio is over the above range, sulfurs are aggregated each other and may be difficult to receive electrons, thereby making it difficult to participate directly in electrode reaction.

Further, the sulfur is located on the surface as well as inside of the pores of the porous carbon material, and at this time, it may be present in an area of less than 100%, preferably 1% to 95%, and more preferably 60% to 90% of the entire outer surface of the porous carbon material. When the sulfur is present on the surface of the porous carbon material within the above range, it can exhibit the maximum effect in terms of the electron transfer area and the wettability of the electrolyte. Specifically, since the sulfur is impregnated thinly and evenly on the surface of the porous carbon material within the above range, the electron transfer contact area can be increased in the charging and discharging process. If the sulfur is located in the 100% region of the surface of the porous carbon material, the porous carbon material is completely covered with the sulfur. Therefore, since the wettability of the electrolyte may be lowered and the contact with the conductive material contained in the electrode is decreased, the electrode cannot receive electrons and therefore, it cannot participate in the reaction.

According to the conventional invention, when sulfur is mixed with an un-dried porous carbon material and then heated, as a result of XRD analysis, only the sulfur of α-phase or the sulfur of β-phase is observed. However, according to the manufacturing method of the present invention, when a porous carbon material dried under specific conditions is mixed under specific conditions and then heated, the sulfur is converted into the sulfur of Rosickyite phase. Further, the ratio that the sulfur contained in the sulfur-carbon composite is converted into the sulfur of Rosickyite phase may be larger than 0% to less than 10% based on the molar ratio of the sulfur. If the proportion of the Sulfur of Rosickyite phase in the sulfur contained in the sulfur-carbon composite is 10% or more, there is a problem in that the stability of the composite is deteriorated, for example, phase is changed in the process of manufacturing the electrode and at a temperature of drying the electrode due to the unstable morphology of the Rosickyite phase.

Further, a part of the sulfur contained in the sulfur-carbon composite is converted into at least one of the sulfur of α-phase and the sulfur of β-phase.

The sulfur-carbon composite can carry sulfur in a high content due to three-dimensionally interconnected and regularly arranged pores having various sizes in the structure. This can lead to the formation of soluble polysulfide by an electrochemical reaction, but it can also be located inside the sulfur-carbon composite. Therefore, when the polysulfide is eluted, a three-dimensionally entangled structure is maintained, thereby suppressing the collapse of a positive electrode structure. As a result, the Lithium-Sulfur battery including the sulfur-carbon composite has an advantage that a high capacity can be realized even at high loading. The loading amount of the sulfur in the sulfur-carbon composite according to the present invention may be 1 mg/cm$^2$ to 20 mg/cm$^2$.

Positive Electrode for Lithium Secondary Battery

The sulfur-carbon composite suggested by the present invention may be preferably used as a positive electrode active material of a lithium secondary battery. In particular, it may be used as a positive electrode active material for a lithium-sulfur battery which contains a sulfur compound in the positive electrode.

The positive electrode is manufactured by coating a composition for forming a positive electrode active material layer on a positive electrode current collector and then drying thereof. The composition for forming a positive electrode active material layer is prepared by mixing the sulfur-carbon composite described above with a conductive material and a binder, and then drying thereof at 40° C. to 70° C. for 4 hours to 12 hours.

Specifically, in order to give an additional conductivity to the sulfur-carbon composite thus manufactured, a conductive material can be added to the positive electrode composition. The conductive material plays a role in allowing electrons to move smoothly in the positive electrode. The conductive material is not particularly limited as long as it does not cause chemical change in the battery and can provide an excellent conductivity and a large surface area, but preferably, it may be a carbon-based material.

The carbon-based material may be at least one selected from graphites such as natural graphite, artificial graphite, expanded graphite; graphene; active carbons; carbon blacks such as channel black, furnace black, thermal black, contact black, lamp black and acetylene black; carbon fibers; carbon nanostructures such as carbon nanotube (CNT) and fullerene; and a combination thereof.

Besides the carbon-based material, according to purpose, metallic fiber such as metal mesh; metallic powder such as copper (Cu), silver (Ag), nickel (Ni) and aluminum (Al); or an organic conductive material such as polyphenylene derivatives can also be used. The conductive materials can be used alone or in combination.

Further, in order to provide the positive electrode active material with adhesion to the current collector, the positive electrode composition may further comprise a binder. The binder must be well dissolved in a solvent, must well construct the conductive network between the positive electrode active material and the conductive material, and also have adequate impregnation of the electrolyte.

The binder applicable to the present invention may be any binder known in the art. Specifically, the binder may be at least one selected from the group consisting of fluorine resin-based binder such as polyvinylidene fluoride (PVdF) and polytetrafluoroethylene (PTFE); rubber-based binder such as styrene-butadiene rubber, acrylonitrile-butadiene rubber and styrene-isoprene rubber; cellulose-based binder such as carboxymethylcellulose (CMC), starch, hydroxypropyl cellulose and regenerated cellulose; polyalcohol-based binder; polyolefin-based binder such as polyethylene and polypropylene; polyimide-based binder; polyester-based binder; and silane-based binders; or a mixture or copolymer thereof, but not limited thereto.

The amount of the binder resin may be 0.5 wt % to 30 wt % based on the total weight of the positive electrode for a Lithium-Sulfur battery, but not limited thereto. If the amount of the binder resin is less than 0.5 wt %, physical properties of the positive electrode may be deteriorated and the positive electrode active material and the conductive material may be separated, and if the amount is over 30 wt %, the ratio of the active material to the conductive material in the positive electrode may be relatively reduced and the battery capacity may be reduced.

Solvent for preparing the positive electrode composition for a Lithium-Sulfur battery in a slurry state should be easy to dry and can dissolve the binder well, but keep the positive electrode active material and the conductive material in a dispersed state without dissolving, most preferably. When the solvent dissolves the positive electrode active material, because the specific gravity of the sulfur in the slurry is high (D=2.07), the sulfur is submerged in the slurry and then the sulfur is driven to the current collector during coating. Thus, there is a tendency that there is a problem on the conductive network, thereby causing a problem on the battery operation.

The solvent according to the present invention may be water or organic solvent, and the organic solvent may be at least one selected from the group consisting of dimethyl formamide, isopropyl alcohol, acetonitrile, methanol, ethanol and tetrahydrofuran.

The mixing of the positive electrode composition may be conducted by a common stirring method using a common mixer, for example, a paste mixer, a high speed shear mixer, a homomixer and the like.

The positive electrode for a Lithium-Sulfur battery can be formed by coating the positive electrode composition on the current collector and then vacuum drying thereof. The slurry may be coated on the current collector with an appropriate thickness according to the viscosity of the slurry and the thickness of the positive electrode to be formed, and the thickness may be suitably selected within the range of 10 μm to 300 μm.

At this time, there is no limitation on the method of coating the slurry. For example, the slurry may be coated by the following methods: Doctor blade coating, Dip coating, Gravure coating, Slit die coating, Spin coating, Comma coating, Bar coating, Reverse roll coating, Screen coating, Cap coating and the like.

The positive electrode current collector is not particularly limited as long as it can be formed to the thickness of 3 μm to 500 μm and has high conductivity without causing chemical change to the battery. For example, it may be a conductive metal such as stainless steel, aluminum, copper and titanium, preferably aluminum current collector. Such positive electrode current collector may be in various forms such as film, sheet, foil, net, porous body, foam and non-woven fabric.

Lithium Secondary Battery

In one embodiment of the present invention, the lithium secondary battery may comprise: the positive electrode described above; a negative electrode containing lithium metal or lithium alloy as a negative electrode active material; a separator interposed between the positive electrode and the negative electrode; and electrolyte which is impregnated in the negative electrode, the positive electrode and the separator and contains lithium salt and organic solvent. In particular, the lithium secondary battery may be a lithium-sulfur battery containing a sulfur compound in the positive electrode.

The negative electrode may use a material that can reversibly intercalate or deintercalate lithium ions (Lit), a material that can reversibly form a lithium-containing compound by reacting with lithium ions, lithium metal or lithium alloy, as a negative electrode active material. The material that can reversibly intercalate or deintercalate the lithium ions may be, for example, crystalline carbon, amorphous carbon and a mixture thereof. The material that can reversibly form a lithium-containing compound by reacting with lithium ions may be, for example, tin oxide, titanium nitrate or silicon. The lithium alloy may be an alloy of lithium and a metal selected from the group consisting of Na, K, Rb, Cs, Fr, Be, Mg, Ca, Sr, Ba, Ra, Al and Sn.

Further, in the process of charging or discharging a lithium-sulfur battery, sulfur used as the positive electrode active material may be converted into an inactive material and may adhere to the surface of the lithium negative electrode. Like this, inactive sulfur refers to sulfur that has undergone various electrochemical or chemical reactions and can no longer participate in electrochemical reactions of the positive electrode. The inactive sulfur formed on the surface of the lithium negative electrode has an advantage that it can serve as a protective layer of the lithium negative electrode. Therefore, a lithium metal and inactive sulfur (e.g., lithium sulfide) formed on the lithium metal can be used as the negative electrode.

Besides the negative electrode active material, the negative electrode of the present invention may further comprise a pretreatment layer made of a lithium ion conductive material and a lithium metal protecting layer formed on the pretreatment layer.

The separator interposed between the positive electrode and the negative electrode is capable of separating or isolating the positive electrode and the negative electrode, and transporting lithium ions between the positive electrode and the negative electrode, and may be composed of a porous non-conductive or insulating material. Such separator may be an independent member such as a thin membrane or film as an insulator having high ion permeability and mechanical strength, and may be a coating layer added to the positive electrode and/or the negative electrode. Further, when solid electrolyte such as a polymer is used as electrolyte, the solid electrolyte may also serve as a separator.

Generally, the separator may have a pore diameter of 0.01 μm to 10 μm and a thickness of 5 μm to 300 μm preferably, and such separator may be glass electrolyte, polymer electrolyte or ceramic electrolyte. For example, as the separator, sheets or non-woven fabrics, made of an olefin-based polymer such as polypropylene or glass fibers or polyethylene, which have chemical resistance and hydrophobicity, or Kraft paper is used. Examples of commercially available separators include Celgard series (Celgard® 2400, product of 2300 Hoechest Celanese Corp.), polypropylene separators (product of Ube Industries Ltd. or product of Pall RAI), polyethylene series (Tonen or Entek) and the like.

The solid electrolyte separator may contain a non-aqueous organic solvent in an amount of less than about 20 wt %. In this case, the solid electrolyte may further contain an appropriate gelling agent in order to reduce the fluidity of the organic solvent. Representative examples of such gelling agent may include polyethyleneoxide, polyvinylidene fluoride, polyacrylonitrile and the like.

The electrolyte impregnated in the negative electrode, the positive electrode and the separator may be a lithium salt-containing non-aqueous electrolyte, composed of a lithium salt and electrolyte. The electrolyte may be non-aqueous organic solvent, organic solid electrolyte and inorganic solid electrolyte.

The lithium salt of the present invention is a material that is well dissolved in the non-aqueous organic solvent and examples thereof include at least one selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, chloroborane lithium, lower aliphatic carboxylic acid lithium, lithium tetraphenyl borate, lithium imide and a combination thereof.

The concentration of the lithium salt may be 0.2 M to 2.0 M, specifically 0.6 M to 2 M, more specifically 0.7 M to 1.7 M according to various factors such as the exact composition of the electrolyte mixture, the solubility of the salt, the conductivity of the dissolved salt, charge and discharge conditions of the battery, working temperature and other factors publicly known in the lithium battery field. If the salt is used at the concentration of less than 0.2 M, the conductivity of the electrolyte may be lowered and the electrolyte performance may be deteriorated, and if the salt is used at the concentration more than 2 M, the viscosity of the electrolyte may be increased and the mobility of lithium ion (Lit) may be reduced.

The non-aqueous organic solvent should well dissolve the lithium salt, and the non-aqueous organic solvent of the present invention may be, for example, non-protic organic solvent such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethyoxy ethane, tetrahydroxy franc, 2-methyl tetrahydrofuran, dimethyl sulfoxide, 1,3-dioxolane, 4-methyl-1,3-dioxane, diethyl ether, formamide, dimethyl formamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate, and the organic solvent may be used alone or in combination of two or more.

The organic solid electrolyte may be, for example, polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

The inorganic solid electrolyte may be, for example, nitrides, halides and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

In order to improve charge/discharge characteristics and flame retardancy, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like may be added to the electrolyte of the present invention. If necessary, in order to give incombustibility, halogen-containing solvents such as carbon tetrachloride and ethylene trifluoride may be further added thereto, and in order to improve high-temperature storage characteristics, carbon dioxide gas, Fluoro-ethylene carbonate (FEC), Propene sultone (PRS), Fluoro-propylene carbonate (FPC) and the like may be further added thereto.

The electrolyte may be used as a liquid electrolyte or a solid electrolyte separator. When used as a liquid electrolyte, the electrolyte further includes a separator that is a physical separator for physically separating electrodes, made of porous glass, plastic, ceramic or polymer.

Hereinafter, examples, comparative example and experimental examples are described in order to illuminate effects of the present invention. However, the following descriptions are just one example regarding contents and effects of the present invention, and the scope of a right and effects of the present invention are not limited thereto.

EXAMPLE

Manufacture of Sulfur-Carbon Composite

Example 1

Carbon nanotube 4.5 g was heated in a 130° C. vacuum oven for 12 hours. The moisture content of the dried carbon nanotube was measured using METROHM 860 KF Coulometer, and the moisture content was 30 ppm.

Then, the dried carbon nanotube was mixed with sulfur (α-Sulfur of Aldrich) 10.5 g in a dry room through a ball milling process using a ball milling apparatus (Model name: LM-BS750, manufactured by LK LABKOREA), and then heated in a 155° C. oven for 30 minutes to manufacture a sulfur-carbon composite. The ball milling process was conducted using a 3 mm-zirconia ball at a milling condition of 300 RPM for 1 hour.

Comparative Example 1

The moisture content of the un-dried carbon nanotube was measured by the same method with Example 1, and the moisture content was 200 ppm. The un-dried carbon nanotube 4.5 g was mixed with sulfur (α-Sulfur of Aldrich) 10.5 g through the same ball milling process with Example 1, and then heated in a 155° C. oven for 30 minutes to manufacture a sulfur-carbon composite.

Comparative Example 2

The same carbon nanotube with Comparative Example 1 1.5 g was mixed with sulfur (α-Sulfur of Aldrich) 3.5 g with a mortar, and then heated in a 155° C. oven for 30 minutes to manufacture a sulfur-carbon composite.

Method of Quantifying Moisture Content of Carbon Nanotube

In Example and Comparative Examples, the method of quantifying the moisture content of the carbon nanotube was the Coulometric method. This method is based on the Karl Fischer reaction, in which the moisture content in a sample is calculated from the number of moles of the electrons used to generate Iodine. According to Faraday's law, the amount of the electricity required to produce one mole of chemical species by electrolytic reaction is 96485 C/mol, which means that 1.03 μmol of $I_2$ is produced when 1 mA of electricity is supplied for 100 seconds. The $I_2$ thus produced participates in the Karl Fischer reaction and allows a very small amount of moisture to be determined in μmol unit of the $I_2$ thus produced. Thus, the current used to generate the Iodine was measured and the amount of moisture was determined from this current value.

Test Example 1: Result of X Ray Diffraction Analysis (XRD) of Sulfur-Carbon Composite For the sulfur-carbon composites manufactured in Example 1 and Comparative Examples 1 and 2, X-ray Diffraction Spectroscopy (Mettler-Toledo, TGA2) analysis was conducted, and the results are shown in FIG. 1.

As shown in FIG. 1, it can be found that the phase of the sulfur contained in the sulfur-carbon composite manufactured in Example 1 was converted into a mixed phase consisting of α-phase, β-phase and Rosickyite phase. On the contrary, it was confirmed that the phase of the sulfur contained in the sulfur-carbon composite manufactured in Comparative Example 1 was only β-phase, and the phase of the sulfur contained in the sulfur-carbon composite manufactured in Comparative Example 2 was only α-phase.

Test Example 2: Evaluation of Battery Performance

Using the sulfur-carbon composites manufactured in Example 1 and Comparative Examples 1 and 2, slurry was prepared with a weight ratio of sulfur-carbon composite:conductive material:binder=90:5:5 and coated on an aluminum foil current collector having a thickness of 20 μm to manufacture an electrode. At this time, carbon black as the conductive material, and styrene butadiene rubber and carboxymethyl cellulose as the binder were used. The electrode thus manufactured was dried in a 50° C. oven overnight to manufacture a positive electrode for a lithium-sulfur battery.

A lithium-sulfur battery coin cell was manufactured using the positive electrode for a lithium-sulfur battery as a positive electrode, polyethylene as a separator and a 50 μm-thick lithium foil as a negative electrode. At this time, the coin cell used electrolyte prepared by dissolving 1 M LiFSI and 1% $LiNO_3$ in an organic solvent composed of diethylene glycol dimethyl ether and 1,3-dioxolane (DEGDME: DOL=6:4 volume ratio).

The coin cell thus manufactured was charged and discharged three times at 0.1 C using a charge-discharge measuring apparatus, and then subjected to a charge-discharge test by applying 0.3 C. The results are shown in Table 1 and FIG. 2.

TABLE 1

|  | Discharge capacity (mAh/g) |
| --- | --- |
| Example 1 | 1,087 |
| Comparative Example 1 | 1,019 |
| Comparative Example 2 | 1,069 |

As shown in Table 1, it was found that the initial discharge capacity of Example 1 is the best. Referring to the charge/discharge profile of FIG. 2, when comparing the batteries using the composites of Example 1 and comparative Example 1, which used the same amount of sulfur, the graph using the composite of Example 1 progresses more to the right. Therefore, it can be found that the discharge capacity is increased compared to the same amount of sulfur, and it also can be found that the reactivity of Example was improved at the same loading. This is due to the phase difference of sulfur between the sulfur-carbon composite prepared in Example 1, which contains a mixed phase with the sulfur of α-phase, the sulfur of β-phase and the sulfur of Rosickyite phase, and the sulfur-carbon composite prepared in Comparative Example 1, which contains only the sulfur of β-phase.

Further, in the case of Comparative Example 2, which used mortar mixing, if the ball milling process of Comparative Example 1 is used for mass production, it can be found that there is a problem that the discharge capacity reduction is inevitable as shown in the above-mentioned results of Comparative Example 1.

Thus, it can be found that the discharge capacity, which is inevitably reduced when the size of the manufacturing process is increased for mass production by the ball milling process as in Comparative Example 1, rather than small volume production by the mortar mixing as in Comparative Example 2, can be improved by introducing the sulfur of Rosickyite phase as in Example 1.

The invention claimed is:

1. A method for manufacturing a sulfur-carbon composite comprising the following steps of:
 (a) drying a porous carbon material; and
 (b) adding sulfur to the porous carbon material resulting from the drying of step (a), and mixing the sulfur and porous carbon material by a ball milling process and then heating the resulting ball milled product,
 wherein the drying of step (a) results in porous carbon material having a moisture content of 50 ppm or less.

2. The method for manufacturing the sulfur-carbon composite of claim 1, wherein the porous carbon material comprises at least one selected from the group consisting of graphite, graphene, carbon black, carbon nanotube, carbon fiber and activated carbon.

3. The method for manufacturing the sulfur-carbon composite of claim 1, wherein the drying of step (a) is conducted at a temperature of 100° C. to 150° C. for 6 hours to 36 hours.

4. The method for manufacturing the sulfur-carbon composite of claim 1, wherein the ball milling process of step (b) is conducted at 100 rpm to 500 rpm for 30 minutes to 5 hours.

5. The method for manufacturing the sulfur-carbon composite of claim 1, wherein the heating of step (b) is conducted at a temperature of 130° C. to 170° C.

6. The method for manufacturing the sulfur-carbon composite of claim 1, wherein in step (b), the sulfur and the porous carbon material are mixed at a weight ratio of 9:1 to 5:5.

7. The method for manufacturing the sulfur-carbon composite of claim 1, wherein a weight of the mixture of the sulfur and the porous carbon material mixed in step (b) is 10 g or more.

8. The method for manufacturing the sulfur-carbon composite of claim 1, wherein sulfur of Rosickyite phase is contained in the sulfur-carbon composite in an amount of more than 0 wt % and less than 10 wt %.

9. The method for manufacturing the sulfur-carbon composite of claim 8, wherein the sulfur-carbon composite further comprises (a) sulfur of α-phase, (b) sulfur of β-phase, or (c) sulfur of α-phase and sulfur of β-phase.

* * * * *